No. 692,468. Patented Feb. 4, 1902.
J. McCAFFREY.
SHIPPER MECHANISM.
(Application filed June 12, 1901.)

(No Model.)

Witnesses:
Wm. H. Varnum.
W Stanley Campbell

Inventor:
John McCaffrey.
By Henry J. Miller
atty

UNITED STATES PATENT OFFICE.

JOHN McCAFFREY, OF LAWRENCE, MASSACHUSETTS.

SHIPPER MECHANISM.

SPECIFICATION forming part of Letters Patent No. 692,468, dated February 4, 1902.

Application filed June 12, 1901. Serial No. 64,275. (No model.)

*To all whom it may concern:*

Be it known that I, JOHN MCCAFFREY, a citizen of the United States, residing at Lawrence, in the county of Essex and State of Massachusetts, have invented certain new and useful Improvements in Shipper Mechanism, of which the following is a specification, reference being had therein to the accompanying drawings.

This invention relates to improvements in shipper mechanisms, and particularly to that class of shipper mechanisms wherein driving means are shipped into and out of operative association with a driven mechanism.

The object of the invention is to maintain a thrust-resisting pressure on a laterally-movable and rotative driving mechanism.

Another object of the invention is to provide a compound thrust-resisting member for a shipper mechanism with means for separating the parts thereof in degree and rapidity independent of the movement of the actuator or controller.

Another object of the invention is to improve the general construction of shipper devices of this nature.

The invention consists in such novel features of construction and combination of parts, as shall hereinafter be more fully described, and pointed out in the claims.

Figure 1:
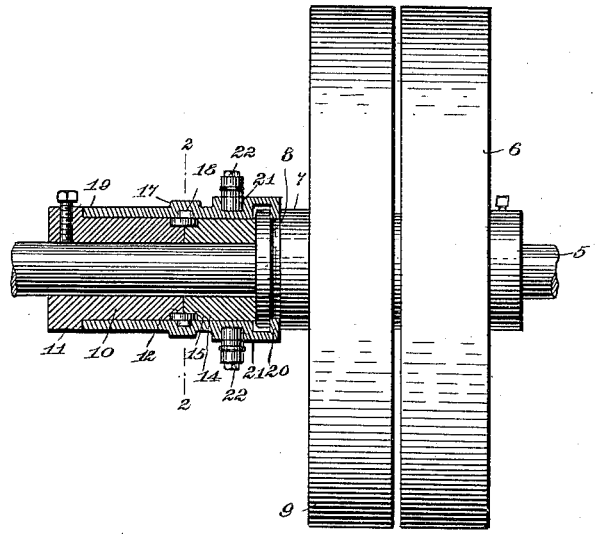
Figure 2:
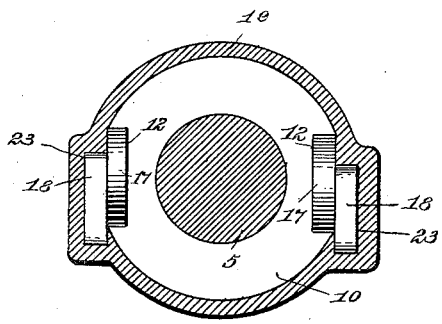
Figure 3:
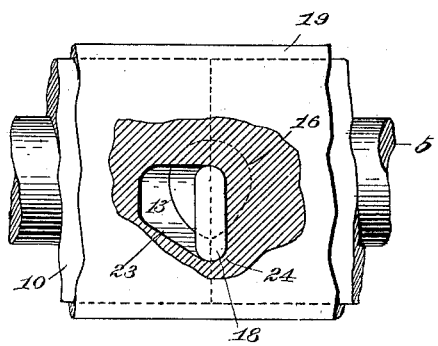
Figure 4:
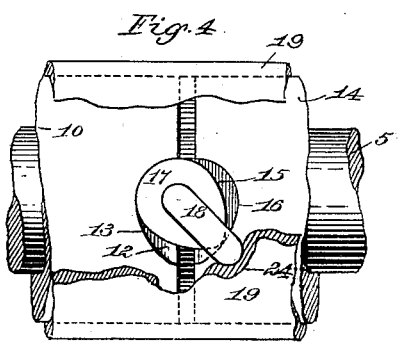

Figure 1 represents in elevation a pair of friction-pulleys in relation to the improved shipper mechanism shown in section. Fig. 2 represents a sectional view taken on line 2 2, Fig. 1. Fig. 3 represents an enlarged view of portions of the device in the retracted position, the shipper or controller sleeve being broken away to show the shape of the lever-recess therein, as well as a plan view of the separator-lever and its cam. Fig. 4 represents a similar view of these parts in the positions they will reach at the time the two parts of the thrust member are fully separated and the driving-pulley is in driving relation to the driven pulley, the shipper-sleeve being broken away to the surface of the thrust member.

Similar numbers of reference designate corresponding parts throughout.

In the drawings, 5 represents a shaft rotatively mounted in any ordinary bearings and adapted for the transmission of power to a single machine, of which the shaft forms a part, or to any one or more of a series of machines. On this shaft is fixed against independent movement the friction member 6 of any well-known structure and shape for this purpose. Also mounted on the shaft 5, but movable independently thereof, both as to rotation and reciprocation, toward and from the friction member 6, is the hub 7, having the annular groove or contraction 8 and the friction member 9, which is complemental to that marked 6. This friction member 9 has usually a belt-flange and is constantly driven by a belt working thereon, so that when moved into frictional relation to the member 6 this latter member and the shaft 5 are driven.

Secured to the shaft 5 in any ordinary manner is the collar 10, having the annular shoulder 11, and furnished at its forward end with one or more depressions 12, each having the curved wall 13, and reciprocal on said shaft 5 and abutting against the end of the collar 10 and the end of the pulley-hub 7 is the collar 14, having at its rear end one or more depressions 15, each having the curved wall 16, thus collars 10 and 14 together forming a resistance to the endwise thrust of the hub 7. In each of the depressions 12 and 15 of the collars 10 and 14 is seated the cam-shaped spreading-lever 17, having the actuating-lever 18, the length of the lever 18 and its disposition on the lever 17 being determined by the proposed throw of the lever 17 to effect the separation of the collars 10 and 14.

Reciprocally mounted on the collars 10 and 14 and abutting against the shoulder 11 is the shipper-sleeve 19, having at its forward end inwardly-turned lips 20 20, which engage in the groove 8 of the hub 7, while in the periphery of this sleeve is formed the annular groove 21 to receive the ends 22 22 of any well-known form of shipper lever or device. Opposite the positions of each of the collar-separator levers 18 18 are formed in the wall of the sleeve recesses 23, of approximately the shape shown in Fig. 3, preferably having the curved seat or pocket 24 to receive the end of the lever 18, the wall of the sleeve being increased in thickness at these points.

In the position shown in Fig. 1 the shaft 5 and the member 6 are inoperative, while the member 9 is supposedly under rotation from a belt or other power-transmitting means. When the shipper 22 is moved forward, the sleeve 19 advances the hub 7 and its member 9 along the shaft toward the member 6, and at the same time the free end of the lever 18 is carried along by the pocket 24, in which it works, and the cam-lever 17, working against the walls 13 and 16 of the recesses 12 and 15, causes the separation of the collars 10 and 14 until the member 9 has been brought into fricional contact with the member 6 and the cam-lever 17 has assumed the position shown in Fig. 4, where it forms a locking-strut between the collars 10 and 14, attention being called to the fact that at all times the collar 14 is adapted to resist the thrust of the hub 7 unless released by the backward movement of the shipper-sleeve.

On the rearward movement of the sleeve 19 the recess or pocket 24 acts on the end of the lever 18 and gradually moves the same backward, thus swinging the cam-lever 17 toward the vertical position, whereby it accommodates itself to the shape of the recesses 12 and 15, and the walls 13 and 16 are allowed to close against the edges of the cam until the parts again assume the positions shown in Figs. 1 and 3.

It will be understood that the shape and location of the levers for separating the collars may vary considerably from that shown in the drawings, and the levers may be so engaged with the collars that on the backward movement of the sleeve 19 the collars are positively drawn together, nor do I wish to limit myself to the particular engagement between the levers and the sleeve 19 that is herein shown.

Having thus described my invention, I claim as new and desire to secure by Letters Patent—

1. Shipper mechanism comprising a two-part thrust-resisting member having a recess formed therebetween, a cam seated in the recess, a shipper-sleeve loosely mounted on said thrust member, and means intermediate the cam and said sleeve for causing the partial rotation of the cam when the sleeve is moved longitudinally.

2. Shipper mechanism comprising a two-part thrust-resisting member having a recess formed therebetween, a cam seated in said recess and having a lever member, and a shipper-sleeve loosely mounted on the thrust member and having means for engaging said cam-lever, for the purpose described.

3. The combination with the collar 10 adapted to be secured to a shaft and having the recess 12, the collar 14 adapted for movement on the shaft and having the recess 15, and the cam-lever 17, seated in such recesses and having the arm 18, of the shipper-sleeve 19 mounted on said collars and having means for engaging the arm 18 to swing the same.

In testimony whereof I affix my signature in presence of two witnesses.

JOHN McCAFFREY.

Witnesses:
HENRY J. MILLER,
ARTHUR E. DENISON.